United States Patent [19]

McCurdy

[11] 4,422,487

[45] Dec. 27, 1983

[54] MULTI-DOG LOG CARRIAGE

[75] Inventor: Gerald D. McCurdy, Klamath Falls, Oreg.

[73] Assignee: The Coe Manufacturing Company, Painesville, Ohio

[21] Appl. No.: 354,238

[22] Filed: Mar. 3, 1982
(Under 37 CFR 1.47)

[51] Int. Cl.³ .................... B27B 29/00; B27B 29/08
[52] U.S. Cl. .................... 144/245 R; 294/103 R; 414/751; 144/245 E
[58] Field of Search .............. 144/162 R, 176, 245 R, 144/242 R, 242 B, 356, 357, 369, 245 E; 83/425.2, 435.1; 294/103 R; 414/751, 741; 198/738, 743, 486

[56] References Cited

U.S. PATENT DOCUMENTS

| 3,382,966 | 5/1968 | Califano et al. | 414/35 |
| 3,503,428 | 3/1970 | Ackerfeldt | 83/409 |
| 4,284,381 | 8/1981 | Minato | 414/751 |
| 4,317,398 | 3/1982 | Jones et al. | 83/425.2 |

Primary Examiner—Francis S. Husar
Assistant Examiner—Jorji M. Griffin
Attorney, Agent, or Firm—Klarquist, Sparkman, Campbell, Leigh & Whinston

[57] ABSTRACT

A rapidly adjustable, end-dogging log carriage for gripping and passing random-length logs through log processing equipment comprised of a plurality of longitudinally-spaced fixed dogs and one movable dog, independently movable with respect to the fixed dogs. Each of the fixed dogs are selectively actuable to grip a random-length log by its ends in association with the movable dog which is moved towards the selected fixed dog so as to clamp the log therebetween.

4 Claims, 4 Drawing Figures

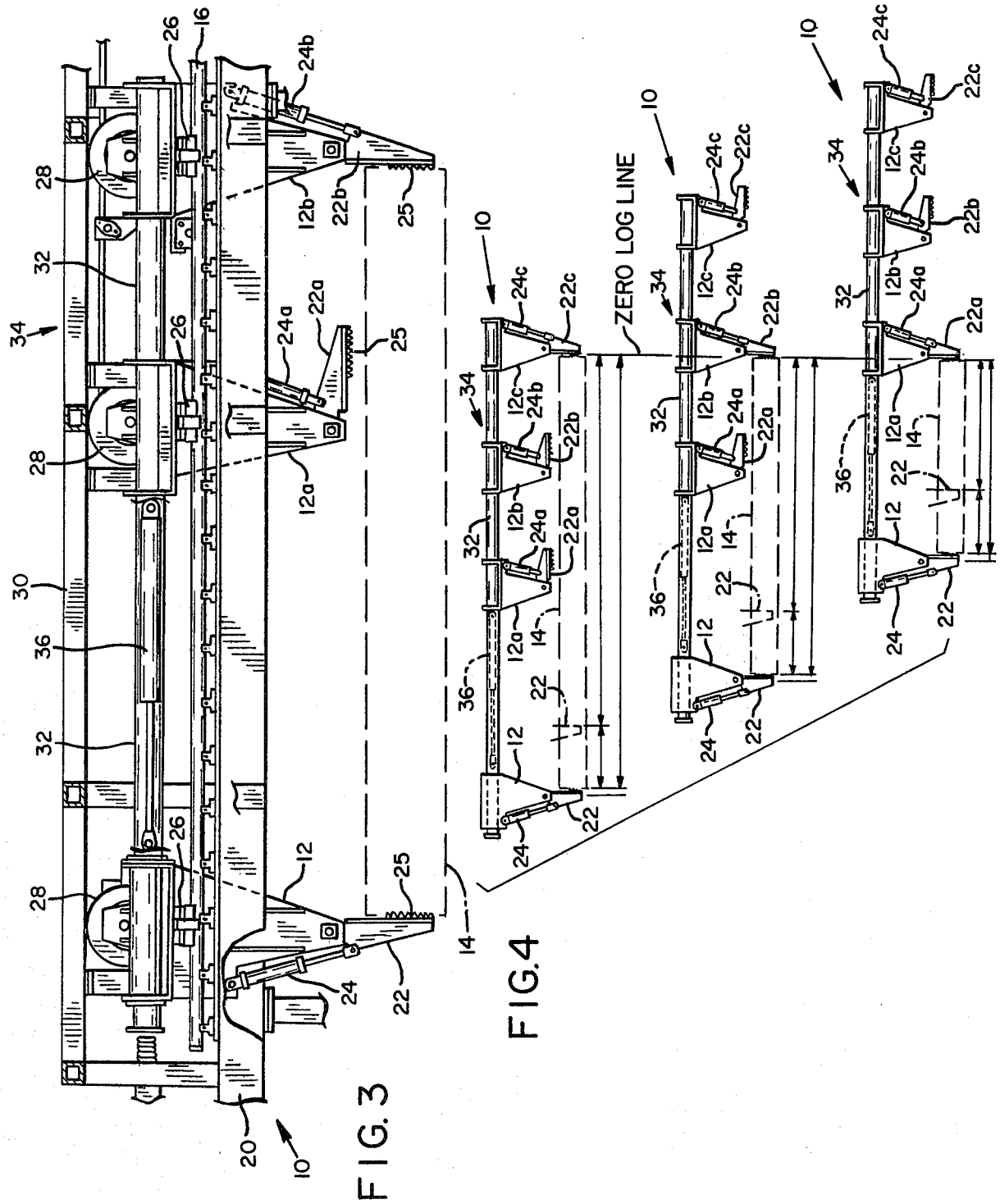

MULTI-DOG LOG CARRIAGE

BACKGROUND OF THE INVENTION

This invention relates to an adjustable end-dogging log carriage for passing random-length logs through log-processing equipment, and more particularly to such a log carriage having more than two dogs for supportably engaging the ends of the log.

Conventional end-dogging log carriage systems typically employ two dogs which clamp or "dog" the log by its longitudinal extremities and then pass the rigidly clamped log through log processing equipment such as chippers and bandsaws. If the logs to be processed are all of the same length, the two dogs are arranged at fixed distance from each other, if however, the logs to be processed are of random length, the log carriage must be extensible to accommodate the varying length of the logs. This is customarily accomplished by providing a log carriage with a movable dog which is movable with respect to the other fixed dog and requiring the log carriage to return to a "backstand" position which places the fixed dog at a predesignated position commonly called the "zero log line." The fixed dog remains stationary at the zero log line while the particular log to be processed is manipulated by other log-processing equipment so that one of its ends is also proximate at the zero log line facing the fixed dog and the movable dog is moved along the supporting carriage track until it is in the proper position to dog the other end of the log. Actual dogging is accomplished by urging the movable dog toward the fixed dog until the log is securely clamped between them and ready to be processed.

Adjustment of the log carriage to accommodate different length logs increases the amount of time required to process each log, thereby affecting the log "throughput" of the entire sawmill. For example, if an eight-foot log is processed immediately after a 24-foot log, the movable dog must move approximately 16 feet toward the fixed dog in order to be in position to clamp the log. Other related disadvantages are the additional energy requirements and increased wear on the carriage components which are caused by the carriage adjustment travel.

SUMMARY OF THE INVENTION

The aforementioned problems associated with adjustable, two dog, end-dogging, log carriages are overcome by the present invention which provides an end-dogging log carriage for random-length logs with multiple fixed dogs, any one of which may be selectively used to supportably engage one end of the log.

A single movable dog supported by a dog assembly is movably supported on the carriage track. Multiple fixed dogs, each supported by respective dog assemblies, are also movably supported on the carriage track, each of the multiple fixed dogs being fixedly supported by their respective dog assemblies to a support mast a fixed distance away from each other fixed dog. Each dog assembly also includes a dog retraction mechanism for individually, selectively extending or retracting each dog, whether movable or fixed. Each dog assembly is connected to a rigid support mast or masts, the respective dog assemblies associated with the fixed dogs each being fixedly connected to the mast and together therewith forming a fixed carriage assembly, while the movable dog assembly is movable connected to the mast. The movable dog assembly and the fixed carriage assembly are further connected by a dog drive mechanism such as a hydraulic cylinder which is capable of displacing the movable dog assembly along the carriage track and support mast with respect to the fixed carriage assembly.

In operation, one of the fixed dogs is selected to be placed in extended configuration at the zero log line based upon the length of the log to be processed. This selection may be made by the operator, or by a computerized scanning and control system which senses the length of the log and selects the appropriate one of the fixed dogs. If the log to be processed is a relatively long log, the fixed dog furthest from the movable dog is selected to be placed at the zero log line, whereas if it is a relatively short log, the fixed dog nearest the movable dog is selected. The movable dog is moved by the dog drive mechanism to a position proximate the other end of the log, the dog extended by the dog retraction mechanism and the dog drive mechanism further moves the extended movable dog toward the selected extended fixed dog, thereby clamping the log between the dogs. It will be apparent that the movable dog will not be required to travel the extreme distances required in a two dog log carriage because the major carriage length adjustment is accomplished by the selection of the appropriate fixed dog. In this way, the log throughput of the sawmill is increased, energy is saved, and wear on the equipment is reduced.

Accordingly it is a principal objective of the present invention to provide an improved adjustable, enddogging log carriage having more than two dogs.

It is a further object of the present invention to provide such an apparatus which will increase the log throughput in a random-length sawmill.

It is a further object of the present invention to provide such an apparatus that will reduce energy consumption and equipment wear in an random-length sawmill.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 3 is a partially cutaway elevational view of the multi-dog log carriage shown in FIG. 1

FIG. 4 is a demonstrative elevational view of another embodiment of the invention.

DETAILED DESCRIPTION OF THE INVENTION

Figure 2:
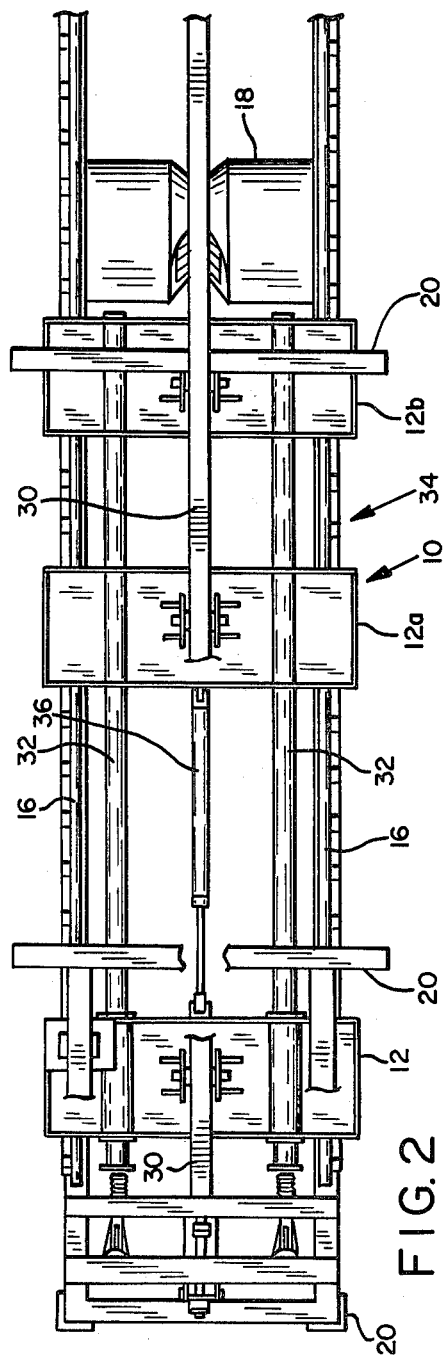
FIG. 2 is a partially cutaway plan view of the multi-dog carriage shown in FIG. 1
Figure 1:
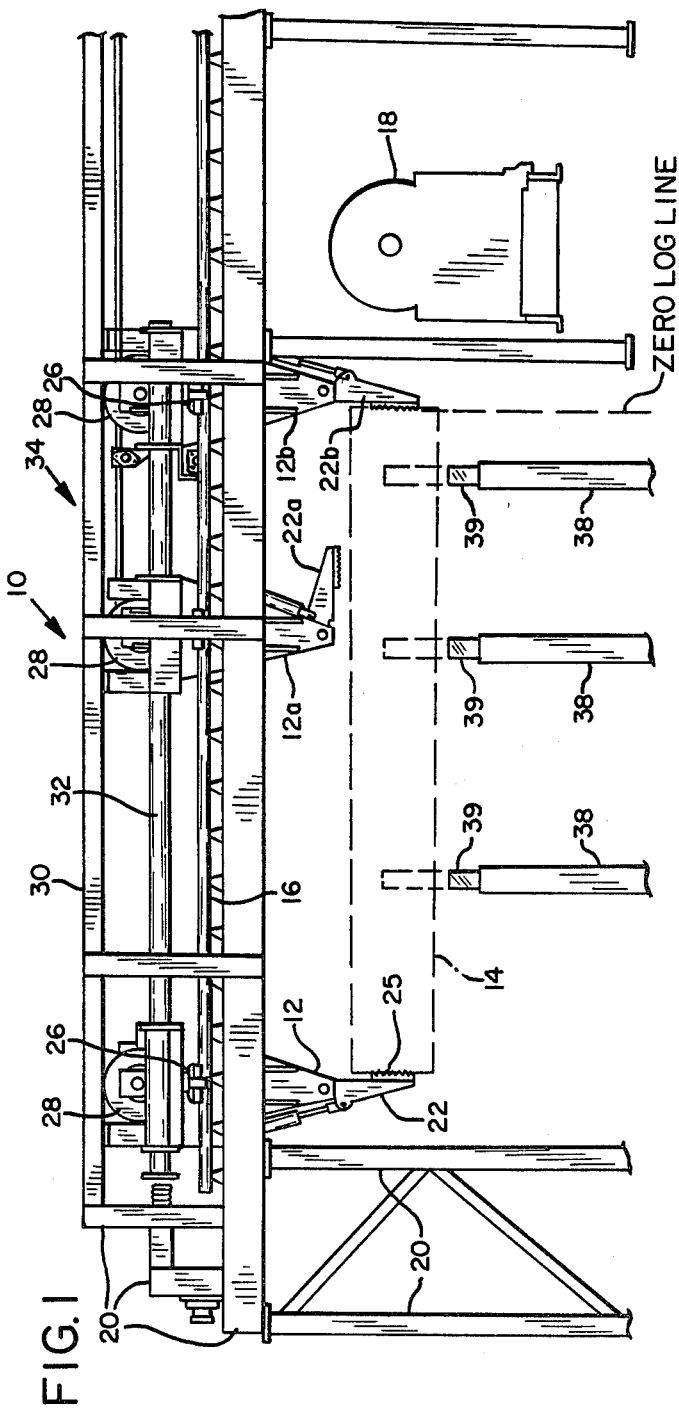
FIG. 1 is an elevational view of the multi-dog log carriage.

The present invention provides an adjustable end-dogging log carriage 10 having more than two dogs which are capable of clamping the log 14 for processing logs of random length. Referring to FIGS. 1, 2 and 3, a movable dog assembly 12 is supported on a longitudinally-extending track 16 as are two fixed dog assemblies 12a and 12b. Each dog assembly 12, 12a, 12b, shown in greater detail in FIG. 3, includes individual dogs 22, 22a, and 22b, each dog being equipped with a plurality of short spikes 25 for penetratingly gripping the ends of the log 14, and dogging cylinders 24, 24a and 24b for selectively extending and retracting the respective dogs, each dog being pivotably connected to the respective dog assembly. The dog assemblies 12, 12a and 12b also include bearings 26 for supporting the dog assemblies on the track 16 and "hold-down wheels" 28 for keeping the bearings 26 on the track 16 by pressing against an upper support rail 30. The dog assemblies 12, 12a, 12b are connected by two support masts 32 as shown in FIG. 2, the dog assembly 12 associated with the movable dog 22 being slidably connected to the mast 32, while the dog assemblies 12a and 12b associated with the two fixed dogs 22a and 22b are fixedly connected to the masts 32 a fixed distance apart and therewith form a fixed carriage assembly 34. Further connecting the movable dog assembly 12 with the fixed carriage assembly 34 is a dog drive mechanism, preferably a hydraulic cylinder 36, capable of displacing the movable dog assembly 12 along the track 16 and support masts 32 with respect to the fixed carriage assembly 34.

The track 16, carried on a support structure 20, extends from the backstand position shown in FIGS. 1 and 2 past log-processing equipment schematically represented by a chipper 18 in FIG. 1 to an outfeed position not shown where the dogs 22 and 22b release what remains of the processed log 14. The fixed carriage assembly 34 is provided with a carriage drive mechanism, not shown, for moving the entire carriage 10, including the movable dog assembly 12, along the track 16. The carriage drive, not shown, is preferably a further hydraulic cylinder or a hydraulic motor and cable drive arrangement commonly used in the industry.

The log carriage 10 of the present invention is preferably used with a computerized sensing and control system, not shown, which is capable of sensing the length of a particular log 14 to be processed and controlling the carriage drive, the various dogging cylinders 24, and the hydraulic cylinder 36 dog drive to position the appropriate fixed dog 22a or 22b and the movable dog 22 to supportably engage the extremities of the particular log 14.

In operation, the log 14 is manipulated by other log-processing equipment not shown, such as a log deck, hourglass rolls, and stop and loader, so that the log is placed in the charger 38, shown in FIG. 1, approximately longitudinally parallel with the centerline of the carriage 10 and with one of its ends at the zero log line as shown in FIGS. 1 and 4. In the embodiments shown in FIGS. 1 through 4, the zero log line corresponds to the end of the log nearest the log-processing equipment 18, but configurations having the zero log line remote from the processing equipment 18 are also acceptable. It is important however, as will be explained more fully below, to have the zero log line position correspond with the end of the log carriage 10 which has the fixed dogs 22a, 22b.

The charger 38 shown in FIG. 1 is preferably equipped with two or more retractable charger yokes 39 capable of gripping and supporting the log from below which are shown in extended configuration in dotted lines in FIG. 1. Other chargers which would not interfere with the end-dogging log carriage would also be acceptable. Customarily there are sensing and control apparatus associated with the charger 38 that scans the log 14 while it is held by the charger 38 to determine its dimensions and which causes the charger 38 to align and position the log for the desired processing. The charger 38 is typically capable of traverse movement normal to the carriage centerline to position the longitudinal centerline of the log 14 approximately vertically co-planar with the centerline of the carriage 10. The yokes 39 are then extended, placing the extremities of the log 14 in approximately the same horizontal and vertical plane as the spikes 25 of the dogs 22, 22a and 22b when the dogs are extended. The charger 38 preferably moves the log 14 into position to be dogged by the carriage 10, as the carriage returns to the backstand position shown in FIG. 1 from a "downstream" position. During the carriage movement to the backstand position, the movable dog 22 is customarily retracted by its dogging cylinder 24 so that the dog 22 does not interfere with the log 14 or the charger 38. The appropriate fixed dog, 22a or 22b is selected by the controlling computer or by the operator based upon the predetermined length of the log 14 to be positioned proximate the zero log line, with the appropriate dog 22a or 22b locked in extended position by its respective dogging cylinder 24. As shown in FIG. 1, the fixed dog 22b is positioned a small distance downstream from the zero log line to ensure that the spikes 25 clear the end of the log 14.

When the log 14 is positioned by the charger 38 as shown in FIG. 1, the movable dog 22, having been locked into extended position by the dogging cylinder 24, is moved by the hydraulic cylinder 36 along the masts 32 and the track 16 toward the fixed carriage assembly 34, the movable dog 22 engaging one end of the log 14 with its spikes 25 and driving the other end of the log onto the spikes 25 of the fixed dog 22b. The charger 38 is typically constructed to accommodate this slight longitudinal shifting of the log 14 during the dogging process. When the desired dogging pressure is achieved, as indicated by a sensing device not shown, the hydraulic cylinder 36 locks the movable dog 22 in position relative to the fixed dog 22b. The log 14, now being securely clamped by the dogs 22 and 22b, is released by the charger yokes 39 and the yokes are retracted out of the way.

The carriage drive mechanism moves the log 14 and the log carriage 10 along the track 16 passing the log through the log-processing equipment such as the chippers 18. Typical log-processing equipment suitable for use with this invention may include a bottom face chipper as well as the side chippers shown in FIGS. 1 and 2, used with twin or quad bandsaws, or with a line bar and resaw configuration. When the carriage 10 has passed the log 14, or cant as it is now called, through the log-processing equipment, the dogging cylinders 24, 24b retract their respective dogs, 22 and 22b, dropping the cant at the outfeed position. The carriage 10 is now ready to return to the backstand position where another log is being manipulated by the charger 38 into dogging position.

Turning now to another embodiment of the invention shown in FIG. 4, a log carriage 10 has a fixed carriage assembly 34 which has three fixed dog assemblies 12a, 12b, and 12c fixedly connected to the masts 32. It will be apparent that the embodiment shown in FIG. 4 is identical to that shown in FIGS. 1 through 3 except for the addition of a further fixed dog assembly 12c including a fixed dog 22c and dogging cylinder 24 and the necessary increase in length of the masts 32 and track 16 (not shown) to accommodate the longer carriage.

The advantages of the present invention are clearly shown by the illustrations of FIG. 4. The carriage 10 is able to accommodate logs of considerably different lengths with only a small adjustment of the movable dog 22 by selection of the appropriate one of three fixed dogs 22a, 22b, 22c. In a typical random-length mill, where the logs to be processed range from eight feet to 24 feet, the fixed dogs 22a, 22b, 22c are preferably arranged six feet apart on the masts 32. Selection of the appropriate fixed dog 22a, 22b or 22c requires that the movable dog only be adjusted a maximum of four feet to accommodate any log between eight feet and 24 feet. In a conventional adjustable log carriage with only two dogs, the movable dog 22 would be required to move a maximum of 16 feet.

In addition to saving time, equipment wear and energy as previously discussed, the smaller adjustment required of the movable dog 22 allows use of a smaller, lighter, and less expensive clamping cylinder 36 and masts 32.

Other configurations not shown in the illustrations or discussed above which would be suitable for application with this invention are the provision of a rack and pinion arrangement rather than a hydraulic cylinder 36 as a dog drive mechanism, one mast element 32 rather than two, an underneath end-dogging configuration rather than an overhead end-dogging configuration, and a fixed carriage assembly 34 which incorporates all fixed dogs 22a, 22b and 22c, rather than having separate multiple fixed dog assemblies 12, 12b, and 12c, clamped on the mast 32.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An adjustable, end-dogging log carriage supportingly guided on a longitudinally-extending track for processing random-length logs comprising:

(a) movable dog means movably supported on said track for supportingly engaging one end of a log;
   (b) a plurality of fixed dog means fixedly spaced relative to each other but movably supported on said track for selectively supportingly engaging the other end of the log, with each one of said plurality of fixed dog means being longitudinally and fixedly spaced from each other one;
   (c) independently-actuated dog operating means for selectively extending and retracting each one of said plurality of fixed dog means and said movable dog means;
   (d) dog drive means associated with said movable dog means for displacing said movable dog means along said track with respect to said fixed dog means and clamping the log between said movable dog means and a selected one of said plurality of fixed dog means; and
   (e) carriage means for moving said plurality of fixed dog means and said movable dog means in unison along said track.

2. The log carriage of claim 1 further including mast means for extending between said movable dog means and said plurality of fixed dog means, said movable dog means being movably connected to said mast means and said plurality of fixed dog means being fixedly connected to said mast means.

3. The log carriage of claim 2 wherein said movable dog means includes dog assembly means for movably supporting said movable dog means on said track and for movably connecting said movable dog means to said mast means, said dog assembly means including said dog retraction means.

4. The log carriage of claim 3 wherein each one of said plurality of fixed dog means include respective dog assembly means for movably supporting said respective fixed dog means on said track and for fixedly connecting said respective fixed dog means to said mast means, each of said dog assembly means including dog retraction means, and said plurality of fixed dog means and said respective dog assemblies means together forming a fixed carriage assembly.

* * * * *